Aug. 16, 1955
C. L. McEWEN
2,715,472
MOBILE SHOVEL LOADER
Filed July 14, 1952
2 Sheets-Sheet 1
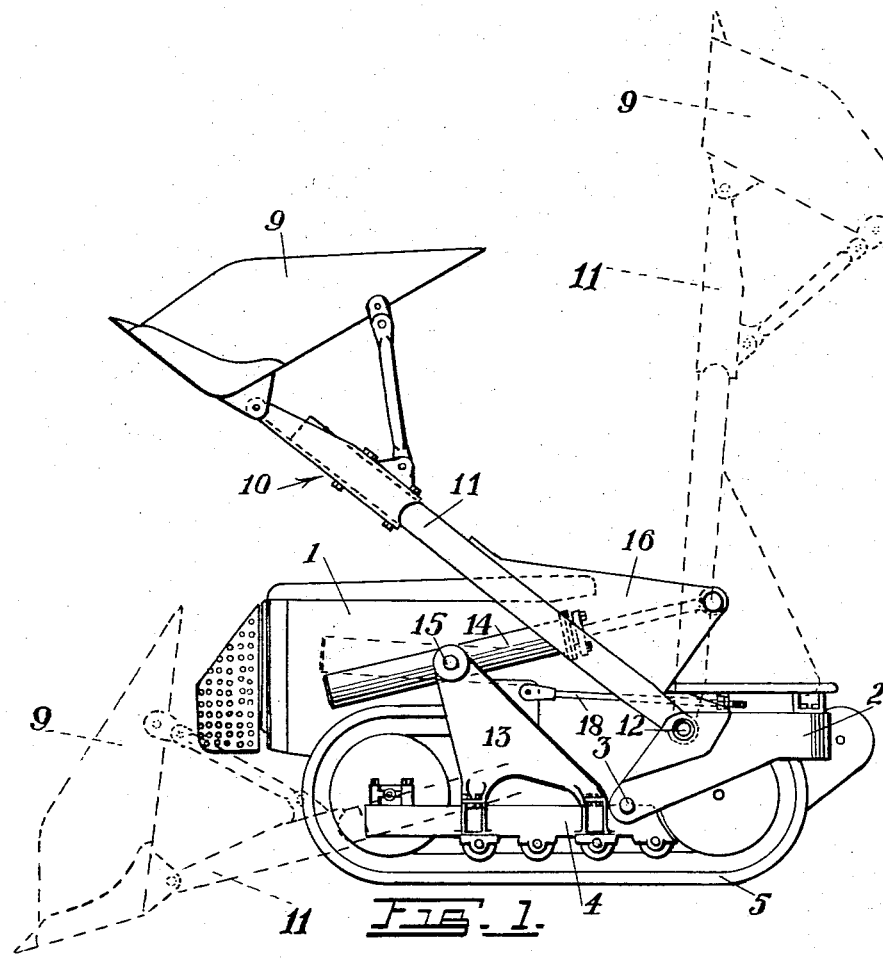
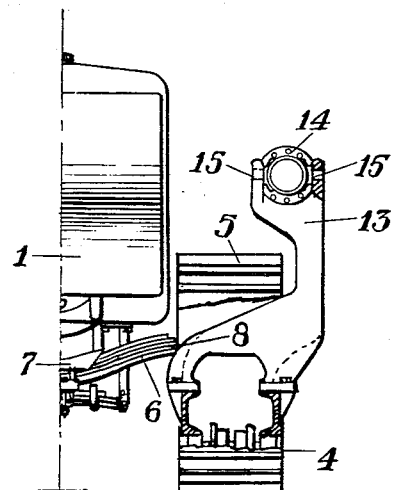
INVENTOR
CHARLES L. McEWEN
Fetherstonhaugh & Co.
ATTORNEYS Aug. 16, 1955   C. L. McEWEN   2,715,472
MOBILE SHOVEL LOADER
Filed July 14, 1952   2 Sheets-Sheet 2
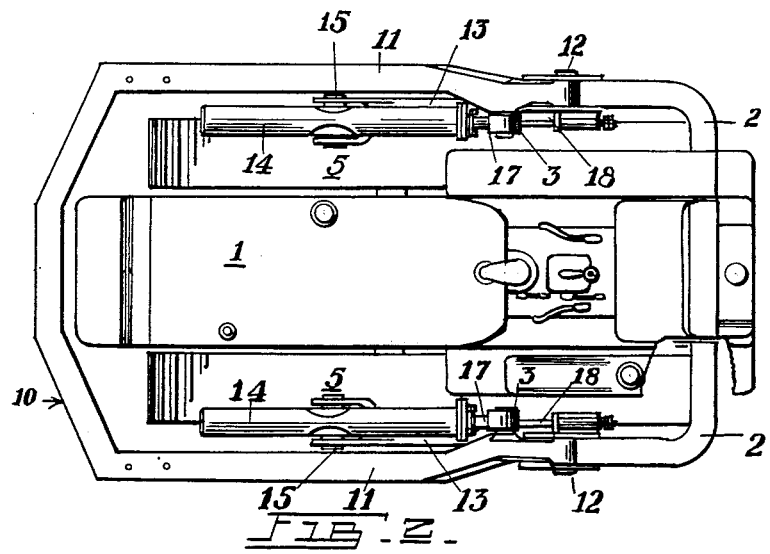
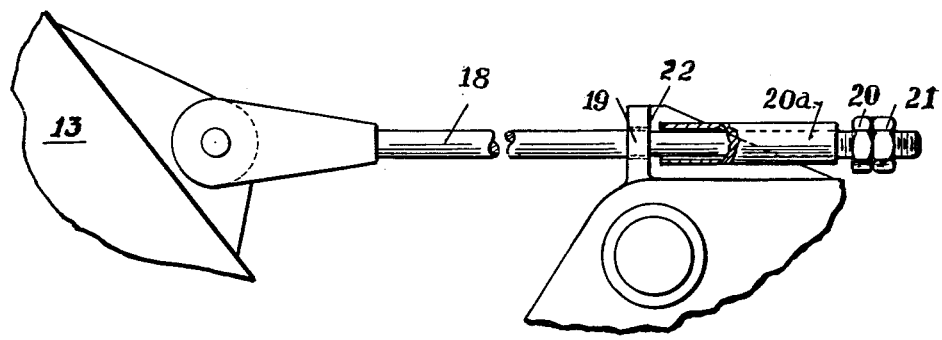
INVENTOR
CHARLES L. McEWEN
Featherstonhaugh &c.
ATTORNEYS

United States Patent Office 2,715,472
Patented Aug. 16, 1955

2,715,472

MOBILE SHOVEL LOADER

Charles L. McEwen, Moncton, New Brunswick, Canada

Application July 14, 1952, Serial No. 298,858

3 Claims. (Cl. 214—131)

This invention relates to mobile shovel loaders of the type employing a self-propelled tractive vehicle.

In self-propelled tractive vehicles, it is desirable to have as much as possible of the endless tracks engaging the ground. For uneven ground, it is necessary to provide an arrangement whereby each track frame is allowed to "oscillate" about a pivot with respect to the body of the vehicle. This feature of tractive vehicles is known as "track oscillation" and may be obtained by having one end (usually the front end) of each track frame attached to the body through spring means while the other end of each track frame is allowed to pivot about a point which is fixed with respect to the body. The spring means is usually of the leaf type which extends transversely to the body and which is fixed at the center thereto with each free end attached to one of the track frames. The front end of the track frame will hereinafter for convenience be assumed to be the end which is capable of oscillation. The vehicle body may then be thought of as having a three point suspension which are the two pivot points towards the rear thereof and the point of attachment of the leaf spring to the front end.

If a self-propelled tractive vehicle is to be used in conjunction with a scoop and a scoop-lifting apparatus as a mobile shovel loader, the three-point suspension becomes a disadvantage when the loaded shovel is lifted. When the vertical projection of the center of gravity of the lifted load falls within the triangle formed by the three points of suspension, there will be little difficulty. If, however, because of the vehicle resting on uneven ground, the vertical projection of the aforementioned center of gravity falls outside the triangle, the vehicle is liable to roll over on its side.

It is the object of the present invention to retain the desirable features of "track oscillation" when the vehicle is being operated without a lifted load, to restrict "track oscillation" while a load is being lifted to obtain greater "roll stability," and to reduce restriction of track oscillation if the load is lifted overhead in relation to the points of pivoting of the track frames.

It will be understood that if "track oscillation" is restrained the vehicle will have four point suspension. In other words, if the front end of the vehicle was supported directly by the treads instead of merely at the center point of the leaf spring, the vehicle will be supported by four points rather than from three points. With four point suspension, the vertical projection of the center of gravity of the lifted load must fall outside the rectangle formed by said four points before tipping or "rolling over" will occur. Thus, with four point suspension there is greater "roll stability."

It has heretofore been proposed to permanently lock the front end of the body frame with respect to the track frames. This previous proposal however prevented any occurrence of "track oscillation." It will be understood that "track oscillation" (that is, maximum traction) is desirable when driving the shovel or scoop into the material to be lifted.

In the arrangement according to the present invention, I provide a scoop-carrying U-shaped member extending around one end of the body of a self-propelled tractive vehicle and attached to the frame thereof at a point on each side which is a predetermined distance from the point about which "track oscillation" occurs. The U-shaped member is provided with an upstanding portion on each of the arms thereof. A double-acting hydraulic power-applying means is disposed on each side of said vehicle and is pivotally attached at one end to the corresponding upstanding portion and at the other end to the forward end of the corresponding track frame. I also provide a restrictor member on each side of the vehicle connected at one end to one of the track frames, and at the other end connected to the body of the vehicle. Each restrictor members acts as a stop means when there has occurred a predetermined amount of movement of the track frame to which it is connected away from the front end of the vehicle.

With the above arrangement, there is "track oscillation" as long as there is no load being lifted. Thus, the tracks are free to oscillate about their pivot points and the vehicle enjoys maximum traction when driving into the material to be loaded. When the scoop has been filled each of the hydraulic power-applying means is employed to direct a force against the upstanding portions of the U-shaped member causing rotation of said member about its pivot points (and resulting in the elevation of the scoop). Because of the spacing of the pivot points of the U-shaped member from the points of oscillation of the track frame, the occurrence of a force between the upstanding portions of the U-shaped member and the track frames causes a torque about the points of attachment of the body frame and the track frames (that is, about the points of "track oscillation"). This torque causes a rotation of the body about said last mentioned points, insofar as the restrictor members will allow it, which causes the effect of the lifting of the load and the load itself to be transferred to the track frames. Thus, the force required for the lifting of the load is used to restrict track oscillation. As long as the hydraulic power-applying means is exerting a force against the upstanding portions of the U-shaped member, "track oscillation" is restricted.

According to the invention the restrictor members are preferably in the form of a "restrictor" rod between each track frame and the body frame. Each restrictor rod is pivotably attached to one of the track frames and extends through a bore in a portion of the body frame. That part of each rod which projects out of the bore remote from the track frame end is provided with an adjustable stop means which will bear against a shoulder provided on the body frame when the desired degree of rotation of the body with respect to the track frames has been reached. The adjustable stop means may be a nut of relatively large diameter which is threaded on the end of each "restrictor" rod.

By the use of the aforementioned "restrictor" rods, the amount of rotation of the body with respect to the track frames is controlled. Thus, with the hydraulic power-applying means directing a force sufficient to rotate the body to bring the aforementioned shoulders against the adjustable stop means, the front end of the track frames will be effectively locked against "track oscillation" and the body will enjoy the benefits of four point suspension. This condition will continue as long as the afore-mentioned force is of such a magnitude as to hold each shoulder against its stop means. As soon as this force reduces, for any reason, the body will again be subject to "track oscillation."

The advantages obtained through the features of the invention will be more fully understood by reference to the following detailed description when taken in conjunction with the attached drawings in which:

Figure 1 is a side view of an embodiment of a mobile shovel loader according to the invention;

Figure 2 is a top view of the embodiment of Figure 1,

Figure 3 is a detail of one side of the loader of Figure 1 partly broken away to show the mounting of the hydraulic means, and Figure 4 is a detail of one of the restrictor rods which will hereinafter be more fully described.

The embodiment shown in the attached drawings and described hereinafter illustrates the invention applied to a mobile shovel loader of the "overhead loader" type. It will be understood, however, that the invention may be applied to a "front end loader" or any other type of mobile shovel loader where it is desired to restrict "track oscillation" when the loaded shovel is lifted.

In Figure 1, the shovel arrangement is illustrated in a half-raised position in full lines. This half-raised position represents the position at which the loaded shovel is held when the vehicle is being backed up towards a truck or similar vehicle which is to be loaded. The bucket of the shovel arrangement is shown in dotted lines in Figure 1 in two further positions; firstly, the maximum lowered or digging position, and secondly, the full-overhead or dumping position.

In the drawings, the body of a self-propelled tractive vehicle is designated at 1 having an integral member 2 attached thereto. The member 2 extends across the back of the body 1 and therefrom a distance forwardly on each side. Pivotally attached at 3, 3 are track frames 4, 4. The pivot points 3, 3 represent the ends of the "dead axle" which is usually provided on vehicles of this type.

Each track frame 4 is arranged to support an endless track 5 in the usual manner. Disposed transversely to the body 1 near the front end thereof is a leaf spring 6 (Figure 3). The center of the leaf spring 6 is fastened to the center of the body 1 near the front end at 7, while each extremity or free end 8 is attached to one of the track frames 4 at a substantial distance forwardly of the dead axle. This arrangement gives the body 1 a three point suspension. (The three points being each of the pivot points 3 of the dead axle, and the point of attachment 7 of the center of the leaf spring 6 to the body 1.)

A shovel or scoop 9 is attached to a U-shaped scoop-carrying member 10, which has arms 11, 11. The arms 11, 11 are pivotally arranged at points 12, 12 which are fixed with respect to the body of the vehicle.

Arranged on and integral with track frames 4, 4 are portions 13, 13 which support hydraulic cylinders 14, 14 journalled therein at 15, 15. Each hydraulic cylinder 14 together with a piston therein is arranged for "double action." Power is applied to upstanding portions 16, 16 of arms 11, 11 from the double-acting hydraulic means through piston rods 17, 17 (Figure 2). With the scoop-carrying member 10 in the digging position, and the piston rods 17, 17 exerting a force against the upstanding portions 16, 16 the scoop-carrying member 10 will tend to pivot about points 12, 12. The scoop 9 and any load therein will be lifted if the force exerted by the rods 17, 17 is of sufficient magnitude. The torque about pivot points 12, 12 will result in a further torque about pivot points 3, 3 and this second torque will be such as to tend to rotate the body 1 about the dead axle with respect to the track frames 4, 4. Thus, the effect of the first-mentioned or lifting torque is to transfer the force resulting from the lifting of the load to the ground-engaging portions of the endless tracks 5, 5 through the track frames 4, 4.

In the half-raised position of the scoop-carrying member 10 shown in Figure 1, the tractive vehicle is liable to "roll over" if the vertical projection of the center of gravity of the loaded scoop 9 falls outside the geometric figure formed by the points of suspension of the vehicle body. With unrestricted "track oscillation," this figure would be substantially a triangle. As the "track oscillation" feature of the vehicle is restricted, the figure approaches a rectangle. Since a loader of the type shown in Figure 1 is usually moved about (sometimes over very uneven ground) when the loaded scoop-carrying member 10 is in the half-raised position, it is desirable not only to restrict, but to eliminate "track oscillation" when the loaded member 10 is half-raised. It is also desirable to retain "track oscillation" when the member 10 is in the lowered or digging position so that maximum traction is available. In order to attain these features, I provide members which may be spoken of as "restrictor rods," and are designated as 18, 18 in the attached drawings. In Figure 4 these rods are shown in more detail as being attached at one end to the track frame portions 13, 13. The other end of each rod 18 extends through a bore 19 formed in the integral member 2 on each side of the body 1. Threaded on each rod 18 is a nut 20, which may be locked with a further nut 21. Each nut 20 acts against a sleeve 20a which engages a shoulder 22 when the action of the hydraulic means causes a clockwise rotation of the body 1 with respect to the track frames 4, 4. When each nut 20 through the sleeve 20a bears against its shoulder 22 further rotation of the body 1 is prevented. At this point the body 1 is rigid with the track frames 4, 4 and the body then enjoys four point suspension. Thus, when any load is lifted, the four point suspension obtained through the provision of the restrictor rods 18, 18 results in very much improved "roll stability." On the other hand, there is sufficient play between the nuts 20, the sleeves 20a, and the shoulders 22 when the scoop-carrying member 10 is in the digging position to allow full "track oscillation" and enable the vehicle to enjoy maximum traction.

The use of a nut 20 threaded on each restrictor rod 18 has the advantage of enabling ready adjustment of the amount of restriction of rotation of the body 1 with respect to the track frames 4, 4.

The nuts 20, with the sleeves 20a, will also act as a stop means when the scoop-carrying member 10 is brought to the dumping position. At this position the upstanding portions 16, 16 come up against the side portions of the member 2 tending to rotate the body 1 in a clockwise direction. Any tendency towards clockwise rotation of the body will be prevented by the nuts 20, 20 bringing the sleeves 20a, 20a against the shoulders 22, 22.

The mobile shovel loader shown in the attached drawings and hereinbefore described has certain inherent advantages beside those already mentioned. Firstly, it will be readily seen that the provision of the pivot points 12, 12 at a substantial distance above the ground enables the use of a shorter scoop-carrying member 10 to clear the front end of the body 1. Secondly, by arranging the hydraulic power-applying means above, instead of outside of, the endless tracks 5 results in a smaller overall width of loader. Further, the arrangement of the hydraulic means above the endless tracks 5 provides less chance for them to be fouled by dirt etc. from the tracks.

What I claim as my invention is:

1. A mobile shovel loader of the type having a body frame and track frame on each side of said body frame, and an endless track means on each of said track frames; said body frame being supported near the rear end thereof by pivot means journalled in each track frame and at the front end thereof through spring means disposed between said body frame and the front ends of said track frames; said mobile shovel loader comprising a scoop-carrying U-shaped member adapted to extend around the front end of said body frame and pivotally attached to each side of said body frame at a predetermined distance from the axis of said pivot means, and a double-acting power-applying means disposed on each side of said body frame; each of said power-applying means being disposed between and pivotally attached to one of said track frames and to one of said arms of said U-shaped member, a restrictor member on each side of said loader connected at one end to one af said track frames, and at the other end connected to said body frame, the point of connection of each said restrictor member to one of said track frames being nearer the front end of said body frame than said pivot means, said restrictor member adapted to act as a stop means when there has occurred a predetermined amount of movement of the track to which it is connected away from the front end of said body frame.

2. A mobile shovel loader of the type having a body frame and track frame on each side of said body frame, and an endless track means on each of said track frames: said body frame being supported near the rear end thereof by pivot means journalled in each track frame and at the front end thereof through spring means disposed between said body frame and the front ends of said track frames; said mobile shovel loader comprising a scoop-carrying U-shaped member adapted to extend around the front end of said body frame and pivotally attached to each side of said body frame at a predetermined distance from the axis of said pivot means, and a double-acting power-applying means disposed on each side of said body frame; each of said power-applying means being disposed between and pivotally attached to one of said track frames and to one of said arms of said U-shaped member, a restrictor member on each side of said loader pivotally connected at one end to one of said track frames, and at the other end extending slidably through a portion of said body frame, the point of connection of each said restrictor member to one of said track frames being nearer the front end of said body frame than said pivot means, said other end of said restrictor member having a stop means arranged to engage a shoulder on said body frame portion when there has occurred a predetermined amount of movement of the track frame to which it is connected away from the front end of said body frame.

3. A mobile shovel loader as claimed in claim 2 comprising a support bracket attached to each track frame in upstanding position therefrom nearer the front end of said body frame than said pivot means, each said bracket pivotally supporting one of the power-applying means and having pivotal connection to one of said restrictor members.

References Cited in the file of this patent
UNITED STATES PATENTS

| | | |
|---|---|---|
| 2,019,938 | Stephens | Nov. 5, 1935 |
| 2,306,313 | Johnson | Dec. 22, 1942 |
| 2,519,974 | Mork | Aug. 22, 1950 |
| 2,526,500 | Pilch | Oct. 17, 1950 |
| 2,625,755 | Drott | Jan. 20, 1953 |